(12) United States Patent
Ogawa et al.

(10) Patent No.: US 9,033,241 B2
(45) Date of Patent: May 19, 2015

(54) BARCODE READING APPARATUS AND COMPUTER PROGRAM PRODUCT

(75) Inventors: Yasuaki Ogawa, Tachikawa (JP); Keiichi Tanioka, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 188 days.

(21) Appl. No.: 13/038,595

(22) Filed: Mar. 2, 2011

(65) Prior Publication Data

US 2011/0220719 A1 Sep. 15, 2011

(30) Foreign Application Priority Data

Mar. 15, 2010 (JP) ................................ 2010-056962

(51) Int. Cl.
*G06K 7/10* (2006.01)
*G02B 3/14* (2006.01)

(52) U.S. Cl.
CPC .............. *G06K 7/10811* (2013.01); *G02B 3/14* (2013.01); *G06K 7/10712* (2013.01); *G06K 7/10861* (2013.01)

(58) Field of Classification Search
CPC .......... G06K 7/10811; G06K 7/10722; G06K 7/10702; G06K 7/10801
USPC ........................................ 235/462.23, 462.24
See application file for complete search history.

(56) References Cited

U.S. PATENT DOCUMENTS

| | | | | |
|---|---|---|---|---|
| 4,843,222 A | * | 6/1989 | Hochgraf ....................... | 235/470 |
| 5,359,185 A | * | 10/1994 | Hanson ........................... | 235/454 |
| 5,473,149 A | * | 12/1995 | Miwa et al. ................ | 235/462.41 |
| 6,053,408 A | * | 4/2000 | Stoner ....................... | 235/462.22 |
| 6,837,433 B2 | * | 1/2005 | Jam et al. ................... | 235/462.22 |
| 7,201,318 B2 | * | 4/2007 | Craen et al. .................... | 235/454 |
| 7,626,769 B2 | * | 12/2009 | Olmstead et al. .............. | 359/721 |
| 2005/0006477 A1 | * | 1/2005 | Patel ......................... | 235/462.24 |
| 2006/0060653 A1 | * | 3/2006 | Wittenberg et al. ...... | 235/462.01 |
| 2006/0202038 A1 | * | 9/2006 | Wang et al. .............. | 235/462.24 |
| 2008/0245872 A1 | | 10/2008 | Good | |

FOREIGN PATENT DOCUMENTS

| | | |
|---|---|---|
| JP | 06-167646 A | 6/1994 |
| JP | 07-029642 U | 6/1995 |
| JP | 11-203383 A | 7/1999 |
| JP | 2007-152766 A | 6/2007 |
| WO | WO 2008/124235 A1 | 10/2008 |

OTHER PUBLICATIONS

European Office Action dated Jan. 18, 2012 (in English) in counterpart European Application No. 11 155 564.5.
Japanese Office Action dated Jun. 4, 2013 (and English translation thereof) in counterpart Japanese Application No. 2012-000924.
Extended European Search Report (EESR) dated Jul. 22, 2011 (in English) in counterpart European Application No. 11155564.5.

* cited by examiner

*Primary Examiner* — Christopher Stanford
(74) *Attorney, Agent, or Firm* — Holtz, Holtz, Goodman & Chick PC

(57) ABSTRACT

Disclosed is a barcode reading apparatus including: a variable focus lens in which a focus position can be adjusted at a high speed according to applied voltage; an imaging section to generate image data by imaging a barcode through the variable focus lens; a control section to change a focus position of the variable focus lens and to obtain image data of a plurality of image areas with different focus positions in one frame from the imaging section when image data of one frame is obtained from the imaging section; and a decoding section to decode a barcode image included in the image data of the plurality of image areas obtained by the control section.

2 Claims, 17 Drawing Sheets

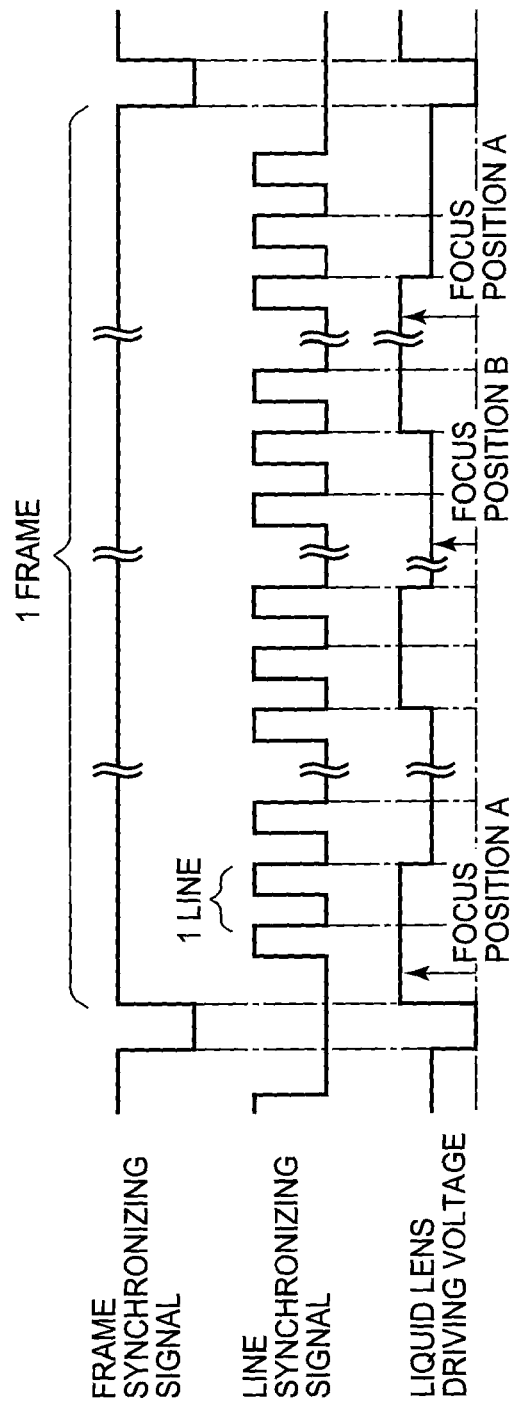

BARCODE READING APPARATUS AND COMPUTER PROGRAM PRODUCT

BACKGROUND OF THE INVENTION

1. Field of the Invention

The present invention relates to a barcode reading apparatus and a computer program product.

2. Description of the Related Art

Conventionally, there is known a two dimensional imager device for capturing a barcode as a symbol and scanning the barcode. Regarding the imager device, degradation of a captured image is determined by degradation ability depending on angle of view and number of pixels and optical degradation depending on focus position, and the degradation is substantially ability to read barcode (reading depth ability). In a conventional imager device, since the angle of view and focus position are fixed, reading ability is characterized by the manner of setting such as high resolution compliant module and long distance compliant module.

In order to enhance the reading depth ability, an imager module which further includes an automatic focus mechanism using a solid lens similar to a camera is developed.

FIG. 17 is a diagram showing an optical system of an imager module including a conventional automatic focus mechanism. As shown in FIG. 17, the imager module including a conventional automatic focus mechanism is composed of an imaging element 211A, lens 31 and driving mechanism of lens 31 (not shown). The lens 31 is a solid lens including plastic, etc. The lens 31 is a plurality of lenses combined and is shown as one lens. When focus is adjusted, the entire lens 31 physically (mechanically) moves with respect to an optical axis with the driving mechanism to perform optical adjustment.

However, the imager module including the conventional automatic focus mechanism performs focus adjustment based on a captured image similar to a camera and such method takes time to obtain a clear image. Therefore, performance of response as a scanner decreases.

There is also known an exposing device for a laser printer employing a liquid lens instead of a solid lens (for example, see Japanese Patent Application Laid-Open Publication No. 2007-152766). The ability of the liquid lens as a lens is not as high as the solid lens. However, the liquid lens has characteristics such as, since the liquid lens does not use mechanical components, the ability of impact resistance is high and the speed of focus adjustment is fast. Therefore, the liquid lens is considered to be suitable for an embedded device.

Moreover, an imager device in which focus depth is deeper than the liquid lens is known (for example, see Japanese Patent Application Laid-Open Publication No. 11-203383). Further, lately, an imager module employing a liquid lens device as one of the automatic focus mechanisms is being developed.

However, the imager device including the conventional automatic focus mechanism using the liquid lens substitutes the solid lens in the conventional automatic focus mechanism with the liquid lens. Therefore, the imager device including the conventional automatic focus mechanism using the liquid lens includes the characteristic of high speed focus adjustment due to the liquid lens, however, the ability of response (scanning time) as a scanner is lower compared to the fixed focus imager.

Here, an example of a process of reading (scanning) a barcode with an imager device including a conventional automatic focus mechanism is described with reference to FIG. 18.

FIG. 18 is a diagram describing an example of a process of reading a barcode with an imager device including a conventional automatic focus mechanism.

An example of reading a barcode B3 at a distance corresponding to focus position F3 and a barcode B1 at a distance corresponding to focus position F1 in order as shown in FIG. 18 is considered. The focus positions F1, F2, F3 and F4 are four levels of focus positions of a liquid lens where an object is aligned from a close position to a far position in order.

In the imager device, the position of the liquid lens is adjusted to the focus position F1 after scanning starts and image capturing and decoding of the barcode B3 is performed. Then, when the barcode image of the obtained image data is unfocused and decoding fails, the position of the liquid lens is adjusted to focus position F2 and image capturing and decoding of the barcode B3 is performed. Then, when the barcode image of the obtained image data is unfocused and decoding fails, the position of the liquid lens is adjusted to focus position F3 and image capturing and decoding of the barcode B3 is performed. Then, when the barcode image of the obtained image is focused and decoding succeeds, the reading of the barcode B3 finishes.

Similarly, the focus position adjustment of the liquid lens, image capturing, and decoding is performed corresponding to change of the focus position from F3 to F4 and to F1. As described above, regarding the imager device including the conventional automatic focus mechanism, the image capturing and decoding is performed many times, and such process is also time consuming. Therefore, there is a demand to shorten time consumed in barcode reading.

SUMMARY OF THE INVENTION

The present invention has been made in consideration of the above situation, and one of the main objects is to shorten reading time in barcode reading using a variable focus lens such as a liquid lens, etc.

In order to achieve any one of the above advantages, according to an aspect of the present invention, there is provided a barcode reading apparatus including:

a variable focus lens in which a focus position can be adjusted at a high speed according to applied voltage;

an imaging section to generate image data by imaging a barcode through the variable focus lens;

a control section to change a focus position of the variable focus lens and to obtain image data of a plurality of image areas with different focus positions in one frame from the imaging section when image data of one frame is obtained from the imaging section; and a decoding section to decode a barcode image included in the image data of the plurality of image areas obtained by the control section.

According to another aspect of the present invention, there is provided a computer program product readable by a computer used in a barcode reading apparatus to encode an instruction to perform computer processing, the computer processing including:

imaging to image a barcode through a variable focus lens in which a focus position can be adjusted at a high speed according to applied voltage to generate image data;

controlling to change the focus position of the variable focus lens to obtain image data of a plurality of image areas with different focus positions in one frame when obtaining image data of one frame imaged in the imaging step; and decoding to decode a barcode image included in the image data of the plurality of image areas obtained by the controlling step.

According to the present invention, reading time can be shortened when barcode reading is performed using a variable focus lens.

BRIEF DESCRIPTION OF THE DRAWINGS

The present invention and the above-described objects, features and advantages thereof will become more fully understood from the following detailed description with the accompanying drawings and wherein;

FIG. 11 is a timing chart showing a frame synchronizing signal and a line synchronizing signal of the imaging element and driving voltage of the liquid lens when a frame image divided at two lines each is imaged with different focus positions;

DETAILED DESCRIPTION OF THE PREFERRED EMBODIMENTS

Preferred embodiments for carrying out the present embodiment are described in detail with reference to the attached drawings. However, the scope of the invention is not limited to the embodiments and the illustrated examples.

First, an external configuration of an apparatus of the present embodiment is described with reference to FIG. 1.

Figure 1:
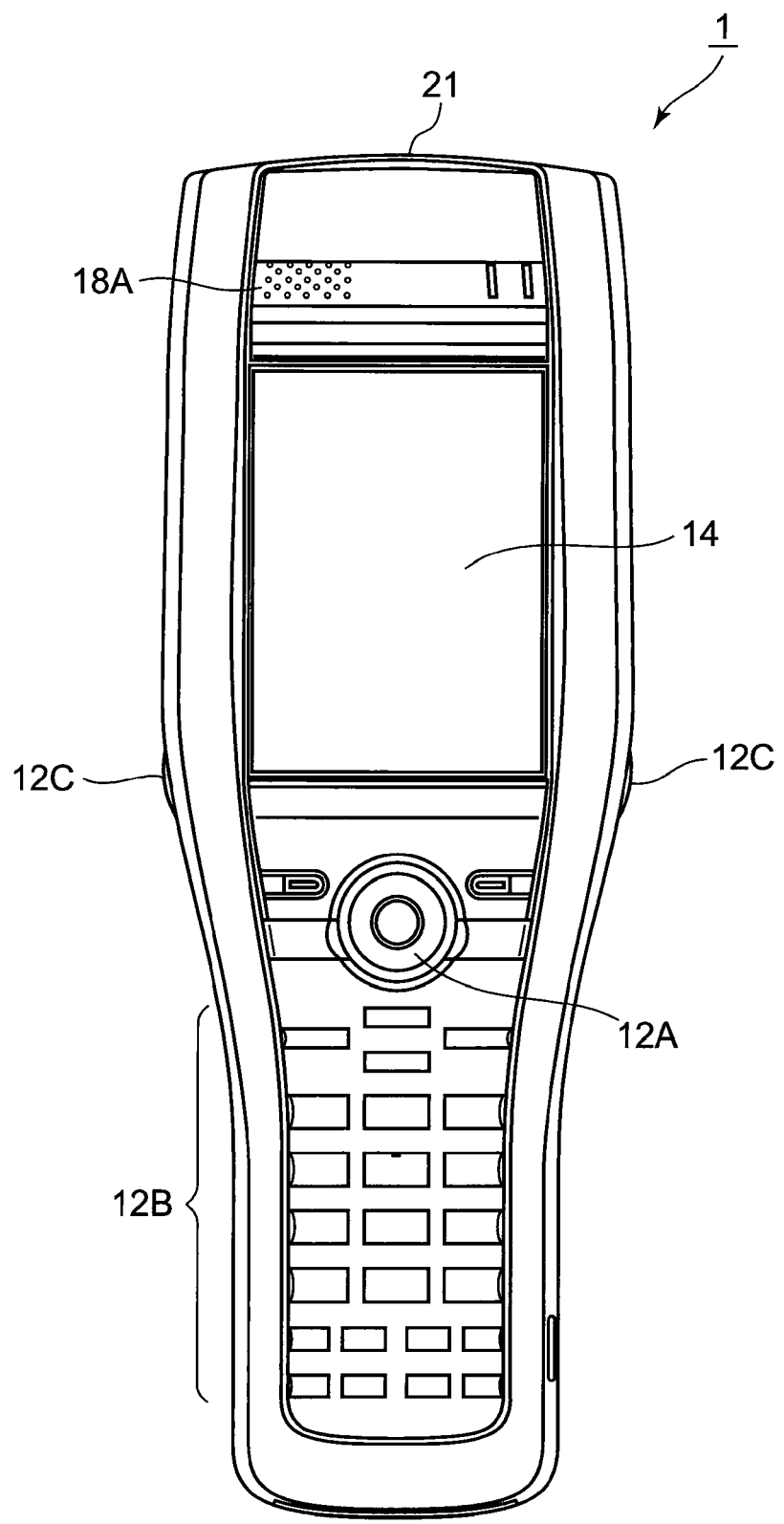
FIG. 1 is a front external view showing a portable terminal representing an embodiment of the present invention.

FIG. 1 is a front external view showing an external configuration of a front of a portable terminal 1 of the present embodiment.

The portable terminal 1 as a barcode reading apparatus of the present embodiment is a portable device including functions such as receiving input of information, storing information, transmitting and receiving information and reading barcode.

As shown in FIG. 1, the portable terminal 1 includes a case 2 as a case. The portable terminal 1 includes a trigger key 12A, various keys 12B, display section 14 and speaker 18A on a front face of the case 2. The portable terminal 1 includes a trigger key 12C on a side face of the case 2. The portable terminal 1 includes an imager module 21 at a tip of the case 2.

The trigger keys 12A and 12C are trigger keys to receive input to start scanning by the imager module 21. Various keys 12B are composed of input keys to input numbers, characters, etc., function keys and the like, and receive input of various information. The display section 14 displays display information such as a through screen, decoding result, etc. in barcode reading using the imager module 21. The speaker 18A outputs a buzzer sound, etc. when decoding succeeds in barcode reading.

Next, a functional configuration inside the portable terminal 1 is described with reference to FIG. 2.

Figure 2:
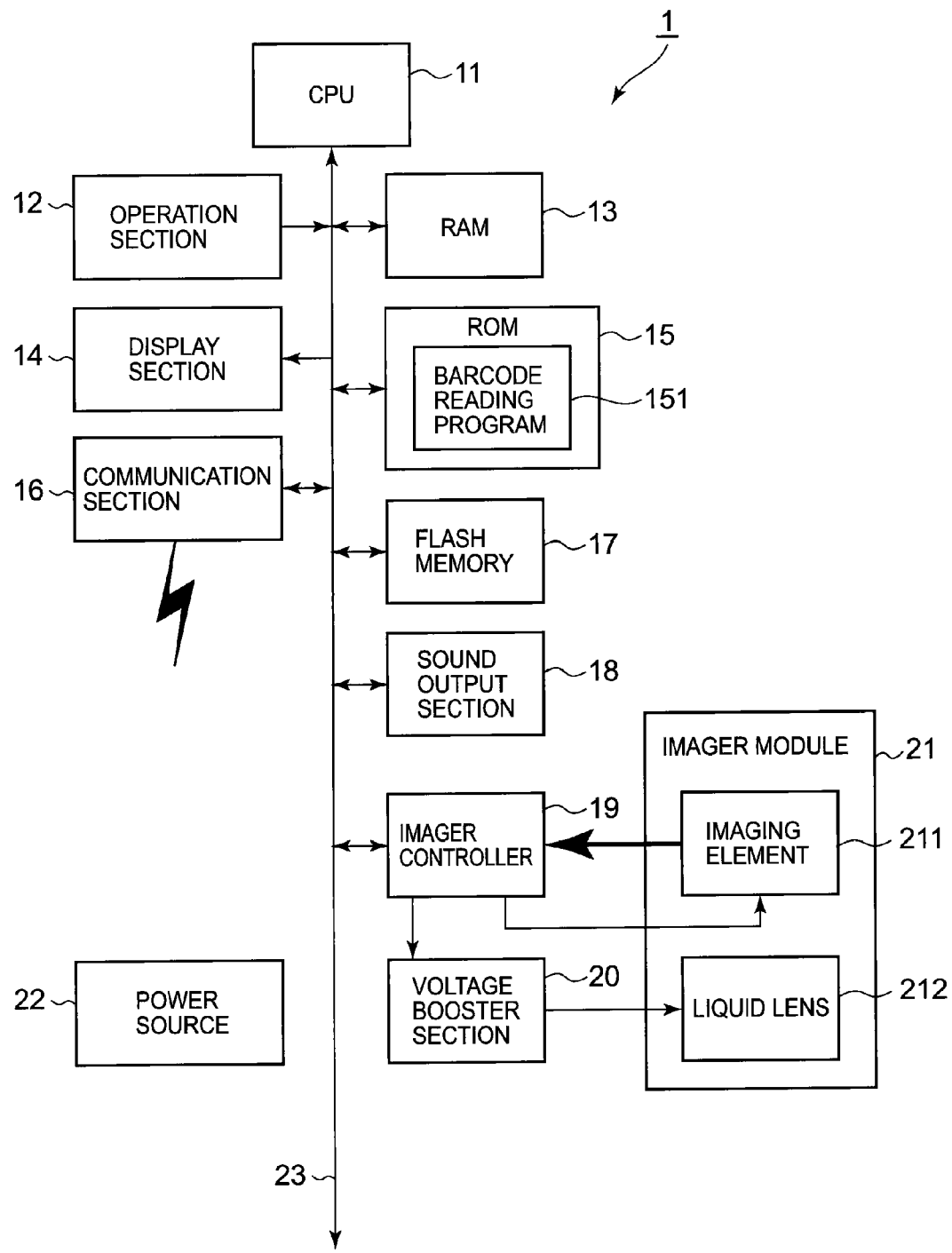
FIG. 2 is a block diagram showing a functional configuration of the portable terminal.

FIG. 2 is a block diagram showing a functional configuration of the portable terminal 1.

As shown in FIG. 2, the portable terminal 1 includes a CPU (Central Processing Unit) 11 as a decoding section, an operation section 12, a RAM (Random Access Memory) 13, the display section 14, a ROM (Read Only Memory) 15, a communication section 16, a flash memory 17, a sound output section 18, an imager controller 19 as a control section, a voltage booster section 20, the imager module 21 and a power source 22. Each section of the portable terminal 1 with the exception of the imager module 21 and the power source 22 are connected to each other through a bus 23. The imager module 21 includes an imaging element 211 as an imaging section and a liquid lens 212 as a variable focus lens.

The CPU 11 controls each section of the portable terminal 1. The CPU 11 reads out a program from the ROM 15 and expands the program in the RAM 13, and performs various processing in coordination with the program expanded in the RAM 13.

According to a barcode reading program 151, the CPU 11 controls the imager controller 19 so that the imaging element 211 images a barcode through the liquid lens 212 and outputs the image data of the frame image and also changes the focus position of the liquid lens 212. The imager controller 19 allows the imaging element 211 to obtain image data of a plurality of image areas of different focus positions in one frame. The CPU 11 controls the imager controller 19 so that the input image data is transferred to the RAM 13 and stored, and also decodes the barcode image included in the image data.

Moreover, the CPU 11 includes a DMA transfer function which performs DMA (Direct Memory Access) transfer of line data of the image input to the imager controller 19 from the imaging element 211 to the RAM 13 and stores the data. The DMA transfer function can be included in the imager controller 19.

The operation section 12 includes a group of keys including various keys 12B, the trigger keys 12A and 12C and the like. The operation section 12 receives the input performed by pressing each key among the group of keys and outputs the operation information to the CPU 11.

The RAM 13 is a volatile semiconductor memory and includes a work area storing various data and various programs.

The display section 14 includes an LCD (Liquid Crystal Display), EL (Electroluminescent) display, etc. and displays various pieces of information.

The ROM 15 is a read only semicondutor memory. The ROM 15 stores a barcode reading program 151.

The communication section 16 includes a communication antenna, a signal processing section, a modulation section, a demodulation section, etc. and is a wireless communication section to communicate with a server apparatus through an access point. The communication section 16 processes a signal of information to be transmitted in the signal processing section, modulates the signal in the modulation section and wirelessly transmits the information to be transmitted as radio waves from the communication antenna to the access point. Moreover, the communication section 16 receives radio waves transmitted from the access point with the communication antenna, demodulates the radio waves in the demodulation section and performs signal processing on the signal in the signal processing section to obtain received information.

Further, the communication section 16 can be a wireless communication section to communicate wirelessly with a server device through a base station by mobile telephone communication method. Also, the communication section 16 can be a wire communication section to communicate wired with a server device through a cradle to place the portable terminal 1.

The flash memory 17 is a nonvolatile semiconductor memory and various pieces of data can be read and written.

The sound output section 18 includes a sound source section, amplifier and speaker 18A, and outputs a buzzer sound when decoding succeeds, etc. According to an instruction to output the buzzer sound input from the CPU 11, the sound output section 18 generates a signal of the buzzer sound in the sound source section, amplifies the sound in the amplifier and outputs the sound from the speaker 18A.

The imager controller 19 is a control section of the imager module 21 and the voltage booster section 20. The imager controller 19 is configured by a semiconductor circuit such as an ASIC (Application Specific Integrated Circuit), etc.

A frame synchronizing signal to synchronize with output timing of one frame of captured image data, a line synchronizing signal to synchronize with output timing of one line of image data and a clock signal to synchronize with image data is input to the imager controller 19 from the imaging element 211. The imager controller 19 monitors the transfer timing of the image data from the imaging element 211 according to the frame synchronizing signal, line synchronizing signal and clock signal. Then, the imager controller 19 changes the focus of the liquid lens 212 on a real time basis by controlling the boosting level of the voltage booster section 20 for driving the liquid lens 212 with a PWM (Pulse Width Modulation) signal according to the monitoring status.

Moreover, the imager controller 19 generates a line specifying signal to specify the line of the input image data and outputs the signal to the imaging element 211.

The voltage booster section 20 applies voltage to the liquid lens 212 according to the PWM signal input from the imager controller 19.

The imager module 21 is a module to adjust the focus and capture the barcode. The imaging element 211 is a CMOS image sensor (Complementary Metal Oxide Semiconductor Image Sensor), and is an imaging element which can output image data by specifying a line. The imaging element 211 exposes the object image entered through the optical system including the liquid lens 212 and performs photoelectric conversion to convert the image to an electric signal of image data of the object.

The imaging element 211 outputs image data of a line specified by the line specifying signal input from the imager controller 19 one line at a time as line data to the imager controller 19. Moreover, the imaging element 211 outputs the frame synchronizing signal, the line synchronizing signal and the clock signal to the imager controller 19. The liquid lens 212 is an optical element composing a portion of the optical system of the imager module 21 and is a variable focus lens in which the focus position can be changed at a high speed according to the applied voltage. The liquid lens 212 is described in detail down below.

The power source section 22 is composed of a secondary battery, etc. and supplies electric power to each section of the portable terminal 1.

Next, the liquid lens 212 is described in detail with reference to FIG. 3 and FIG. 4.

Figure 3:
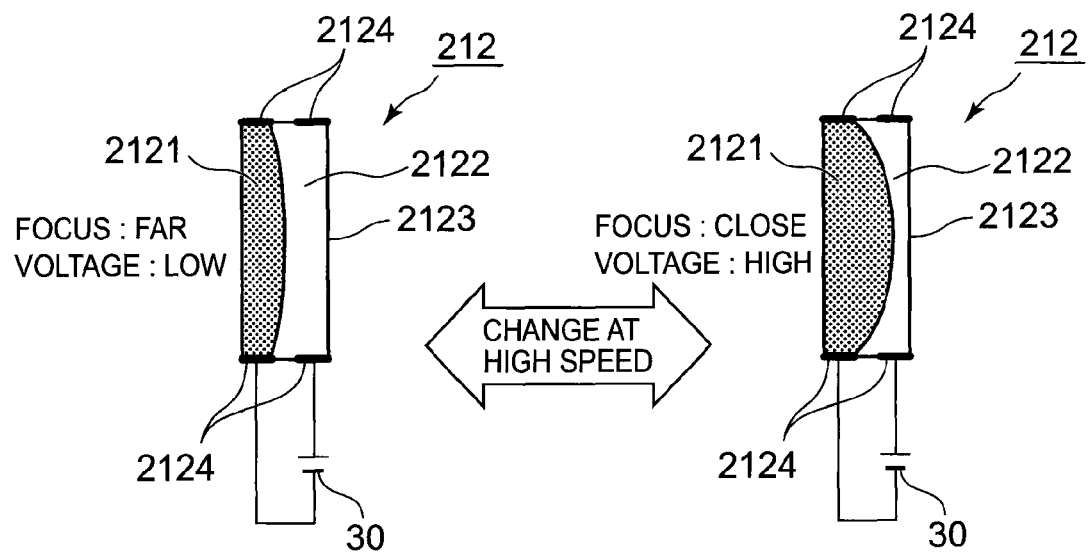
FIG. 3 is a diagram showing a change of focus of a liquid lens.

FIG. 3 is a diagram showing a change of focus of the liquid lens 212 due to change of the applied voltage.

Figure 4:
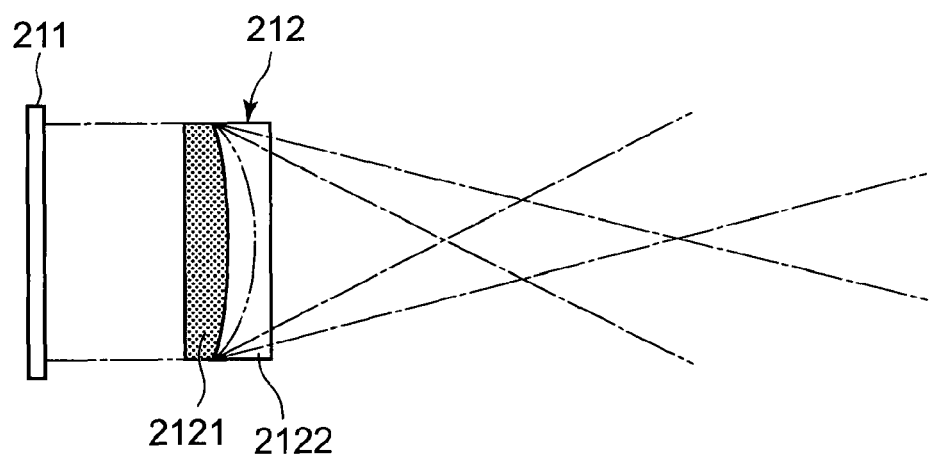
FIG. 4 is a side view showing the liquid lens and an imaging element.

FIG. 4 is a side view showing a configuration of the side face of the liquid lens 212 and the imaging element 211.

As shown in FIG. 3, the liquid lens 212 includes liquid sections 2121 and 2122, container 2123, and electrode 2124. The liquid sections 2121 and 2122 have refractive indexes different from each other and are aqueous solution and oil with the same specific gravity. The container 2123 is a container sealing the liquid sections 2121 and 2122. The electrode 2124 is an electrode provided on a periphery of the liquid sections 2121 and 2122 to apply voltage.

In the configuration assumed here, a power source 30 is connected between the electrode 2124 on the liquid section 2121 side and the electrode 2124 on the liquid section 2122 side. The lens function is realized by the power source 30 applying voltage between the electrode 2124 of the liquid section 2121 side and the electrode 2124 of the liquid section 2122 side so that an interface of a center portion of the liquid sections 2121 and 2122 are curved as a lens. Moreover, when the applied voltage of the power source 30 is increased, the curve of the interface of the center portion of the liquid sections 2121 and 2122 become larger. When the curve of the interface is small, the focus of the liquid lens 212 is focused to a position at a far distance. When the curve of the interface is large, the focus of the liquid lens 212 is focused to a position at a close distance.

Figure 17:
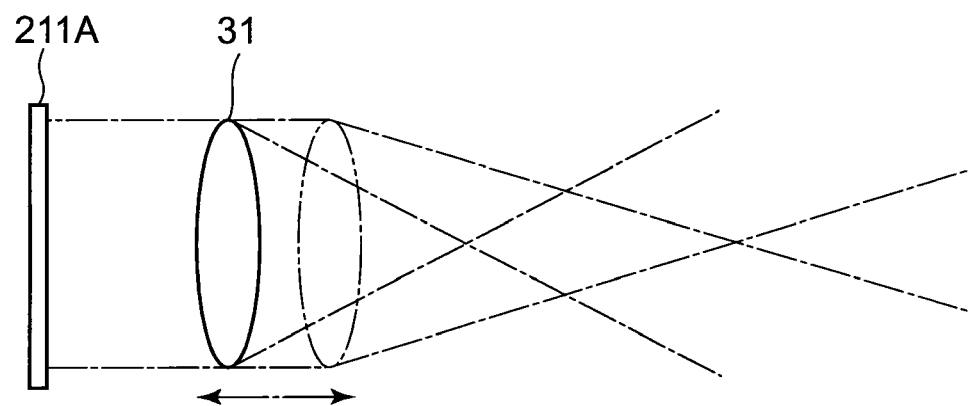
FIG. 17 is a diagram showing an optical system of an imager module including a conventional automatic focus mechanism.

Moreover, since the lens curvature changes according to the amount of the voltage applied to the liquid lens 212, the lens curvature of the liquid lens 212 can be changed electrically at a high speed without moving the lens as shown in FIG. 17. As shown in FIG. 4, the focus of the liquid lens 212 can be adjusted by changing the lens curvature. Therefore, compared to a conventional automatic focus mechanism, there is an advantage that the time necessary for changing the focus can be shortened. As described above, the features of the liquid lens 212 are, the lens curvature can be changed according to the applied voltage level, the durability is enhanced because there is no physical movable section, and the consumed electric power is small because although the applied voltage level is a high voltage, an electric current does not flow.

Next, an operation of the portable terminal 1 is described with reference to FIG. 5 to FIG. 16. First, normal image capturing and decoding is described with reference to FIG. 5 and FIG. 6. Here, the focus of the liquid lens 212 is fixed.

Figure 5:
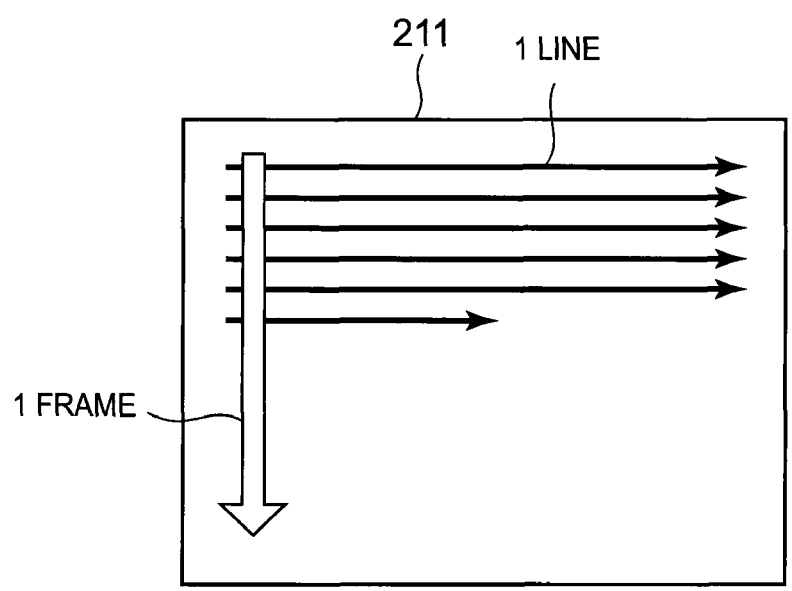
FIG. 5 is a diagram showing a general description of imaging and transfer of image data by the imaging element.
Figure 6:
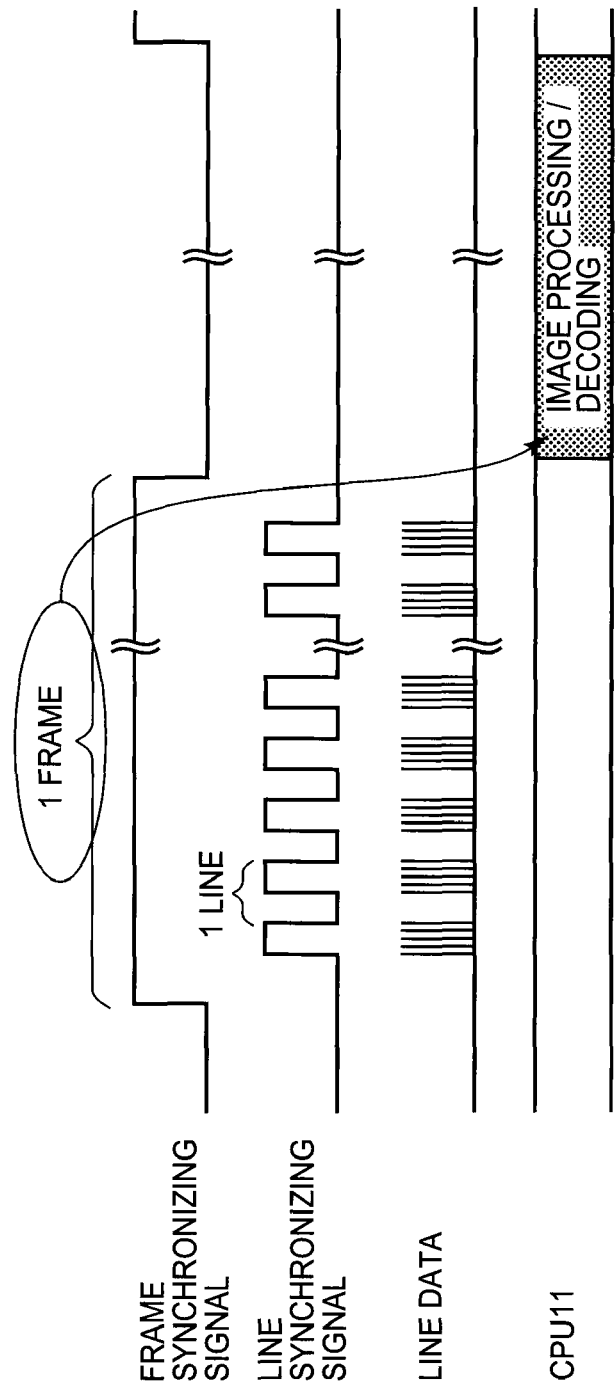
FIG. 6 is a timing chart showing a signal regarding normal image capturing and decoding by the imaging element.

FIG. 5 is a diagram showing a general description of imaging and image data transfer by the imaging element 211 and FIG. 6 is a timing chart of a signal regarding normal image capturing and decoding by the imaging element 211.

As shown in FIG. 5, the imaging element 211 which is a CMOS image sensor is different from a CCD (Charge Coupled Device) image sensor and performs capturing and data transfer one line at a time in one frame of an image. The imaging element 211 performs exposure and transfer of image data (line data) from the top of the sensor one line at a time. When the imaging element 211 finishes transfer of the line data at the bottom of the sensor, the imaging element 211 ends transfer of image data for one frame, and performs exposure and transfer of line data from the top of the sensor one line at a time again with the next frame.

Therefore, the imaging element 211 outputs the frame synchronizing signal, the line synchronizing signal, the clock signal and the data signal which is the image data (line data) as shown in FIG. 6 to the imager controller 19. The imager controller 19 transfers the input data signal to the RAM 13 while synchronizing with the frame synchronizing signal and the line synchronizing signal. When the data signal transfer for one frame ends, image data for one frame is stored in the RAM 13. The CPU 11 performs image processing to combine the plurality of pieces of line data stored in the RAM 13 as image data for one frame to ease decoding, and then performs decoding processing of the barcode. Therefore, in order to finish one decoding processing, capturing time for one frame and time for image processing and decoding processing by the CPU 11 is necessary.

Next, focus adjustment, image capturing and decoding when one barcode is imaged to obtain image data divided in three with different focus positions are described with reference to FIG. 7 to FIG. 10B.

Figure 7:
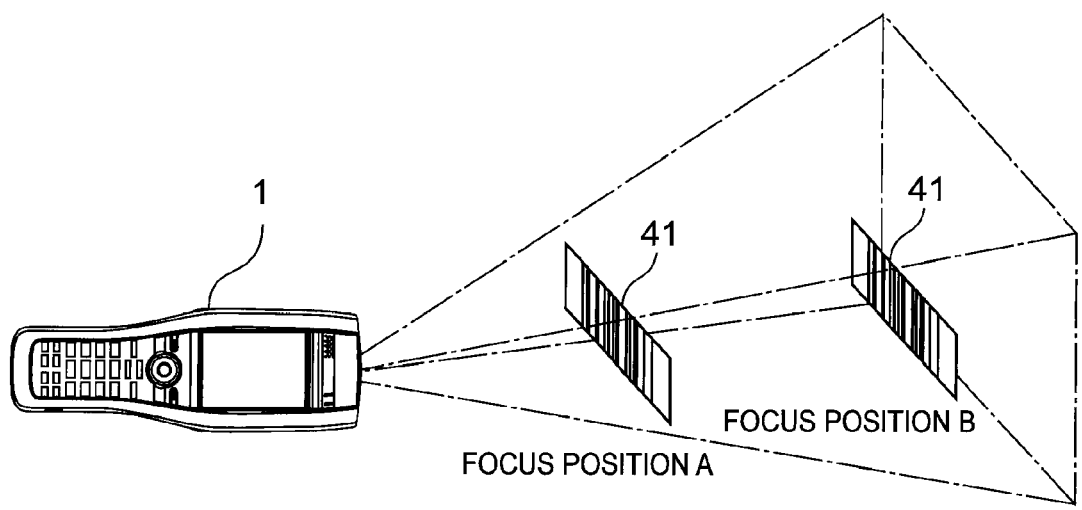
FIG. 7 is a diagram showing scanning of a barcode placed at a close distance or a far distance.

FIG. 7 is a diagram showing scanning of a barcode 41 placed at a close distance or a far distance.

Figure 8:
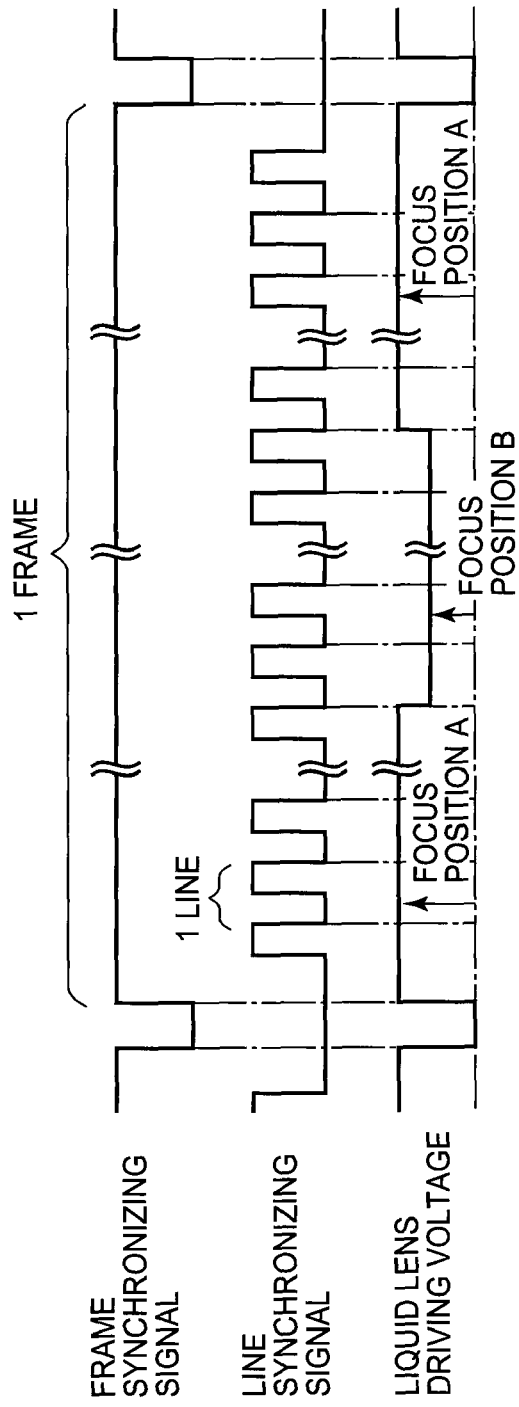
FIG. 8 is a timing chart showing a frame synchronizing signal and a line synchronizing signal of the imaging element and driving voltage of the liquid lens when a frame image divided in three is imaged with different focus positions.

FIG. 8 is a timing chart showing the frame synchronizing signal and the line synchronizing signal of the imaging element 211 and driving voltage of the liquid lens 212 when a frame image divided in three is imaged with different focus positions.

Figure 9A:
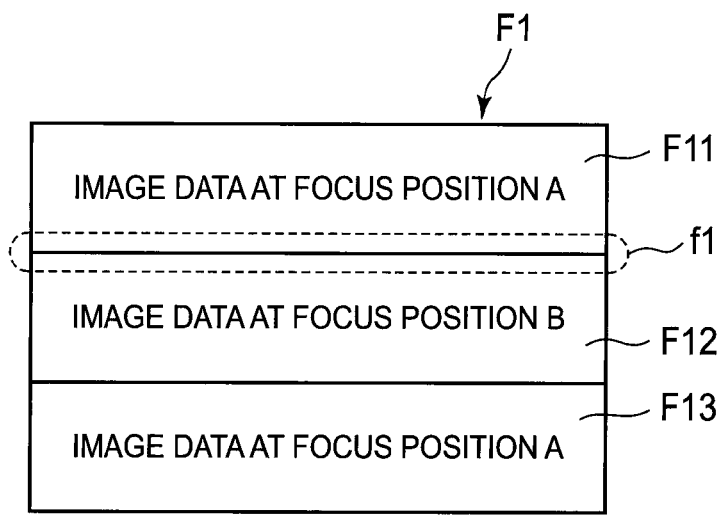
FIG. 9A is a diagram showing image data of a frame image divided in three.

FIG. 9A is a diagram showing image data F1 of a frame image divided in three.

Figure 9B:
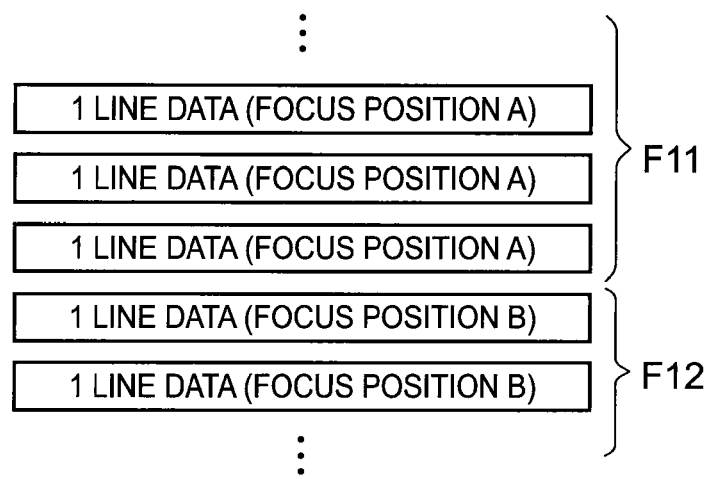
FIG. 9B is a diagram showing enlarged line data in a boundary area shown in FIG. 9A.

FIG. 9B is a diagram showing enlarged line data in a boundary area f1 shown in FIG. 9A.

Figure 10A:
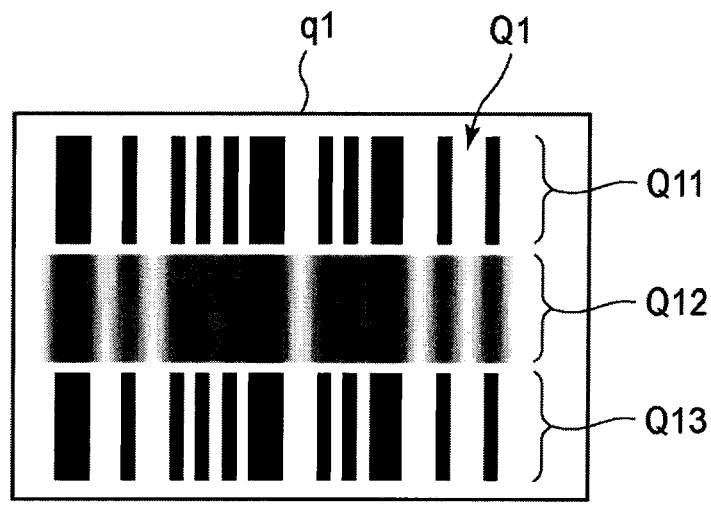
FIG. 10A is a diagram showing a frame image divided in three imaging a barcode at a focus position at a close distance.

FIG. 10A is a diagram showing a frame image q1 divided in three imaging the barcode 41 at a focus position A.

Figure 10B:
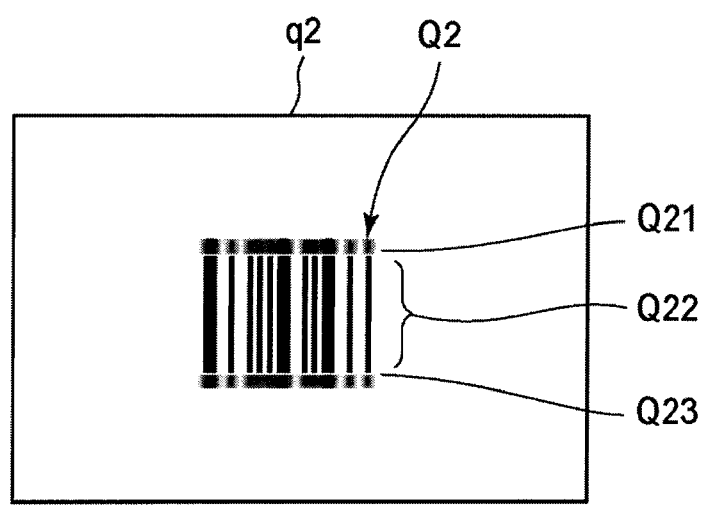
FIG. 10B is a diagram showing a frame image divided in three imaging a barcode at a focus position at a far distance.

FIG. 10B is a diagram showing a frame image q2 divided in three imaging the barcode 41 at a focus position B.

As shown in FIG. 7, the barcode 41 is placed in a focus position A where a focus distance from the portable terminal 1 (imager module 21) is a near distance and a focus position B where the focus distance is a far distance. As one example, in the example described here, image capturing and decoding is performed by the portable terminal 1 on the barcode 41 positioned in the focus position A and the focus position B.

As shown in FIG. 8, when the imager controller 19 receives the frame synchronizing signal and the line synchronizing signal output from the imaging element 211, the imager controller 19 synchronizes with the signal and changes the Duty ratio of the PWM signal to the voltage booster section 20 and changes the driving voltage applied to the liquid lens 212. Since the focus position of the liquid lens 212 changes due to the applied voltage level, the imager controller 19 can change the focus position by synchronizing with the frame synchronizing signal and the line synchronizing signal.

For example, under the control of the imager controller 19, the focus of the imaging element 211 is set to focus position A at the start of the frame and line data transfer is performed from the imaging element 211 to the RAM 13. When the transfer of the line data of one third of the frame is finished, the focus of the imaging element 211 switches to focus position B. Then, when the transfer of the line data of two thirds of the frame is finished, the focus of the imaging element 211 switches to focus position A.

With this, as shown in FIG. 9A, image data F1 with a different focus position in only a third of the entire frame image can be obtained. The image data F1 includes image data F11 and F13 at a focus position A and image data F12 at a focus position B. As shown in FIG. 9B, the border of the focus position is divided in the line data in the border area f1 between the image data F11 and the image data F12 in the image data F1.

When the barcode 41 is read by the portable terminal 1 from a close distance (focus position A), since the relative size of the barcode image with respect to the angle of view of the imaging element 211 becomes large, the barcode image becomes an enlarged image up to the image area of the focus position A and the barcode can be decoded in the image area of the focus position A. When the focus distance matches, depending on the setting value of the focus position A, decoding is possible without adjusting the focus. As shown in FIG. 10A, the frame image q1 when the barcode 41 is placed in a close distance, includes a barcode image Q1 including image areas Q11 and Q13 of the top and bottom and image area Q12 in between. In the image areas Q11 and Q13, the image is focused and the bar is clear. In the image area Q12, the image is not focused and the bar is not clear.

When the barcode 41 is read by the portable terminal 1 from a far distance (focus position B), since the relative size of the barcode image with respect to the angle of view of the imaging element 211 becomes small, the barcode image becomes a small image within the image area of the focus position B and the barcode can be decoded in the image area of the focus position B. When the focus distance matches, depending on the setting value of the focus position B, decoding is possible without adjusting the focus. As shown in FIG. 10B, the frame image q2 when the barcode 41 is placed at a far distance, includes a barcode image Q2 including image areas Q21 and Q23 of the top and bottom and image area Q22 in between. In the image areas Q21 and Q23, the image is not focused and the bar is not clear. In the image area Q22, the image is focused and the bar is clear.

In the decoding of a one dimensional barcode image, for example, the center position of the frame image is set as the initial position of decoding and the barcode image in a direction perpendicular to the bar is decoded and the decoding is performed by moving the decoding position in an upward direction or downward direction with respect to the direction parallel to the bar of the barcode until the decoding succeeds. For example, a plurality of barcode results is referred, and when the barcode is recognized, the decoding succeeds. Therefore, a condition to enable decoding is that there is a clear area throughout the whole length in a direction perpendicular to the bar of the barcode image. Both barcode images Q1 and Q2 are focused and the bar includes clear image areas Q11, Q13 and Q22. When a frame image including such barcode image is loaded, decoding is possible.

Next, focus adjustment, image capturing and decoding when one barcode is imaged to obtain image data divided in two lines each with different focus positions are described with reference to FIG. 11 to FIG. 13B.

FIG. 11 is a timing chart showing the frame synchronizing signal and the line synchronizing signal of image capturing of the imaging element 211 and driving voltage of the liquid lens 212 when an image divided at two lines each is imaged with different focus positions.

Figure 12A:
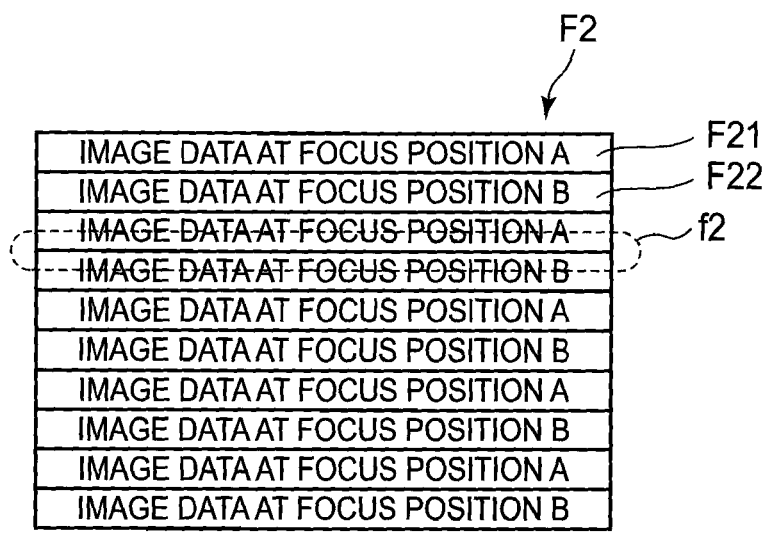
FIG. 12A is a diagram showing image data of a frame image divided at two lines each.

FIG. 12A is a diagram showing image data F2 of a frame image divided at two lines each.

Figure 12B:
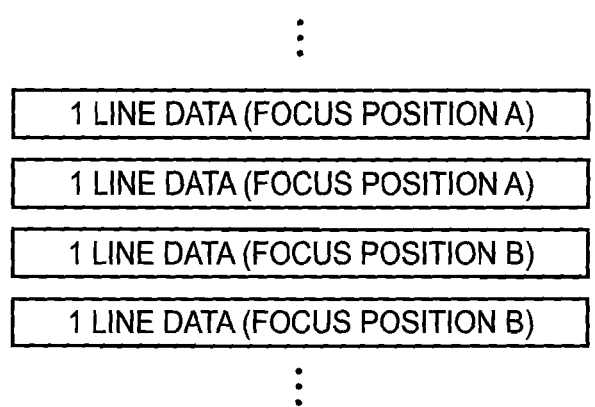
FIG. 12B is a diagram showing enlarged line data in a boundary area shown in FIG. 12A.

FIG. 12B is a diagram showing enlarged line data in a boundary area f2 shown in FIG. 12A.

Figure 13A:
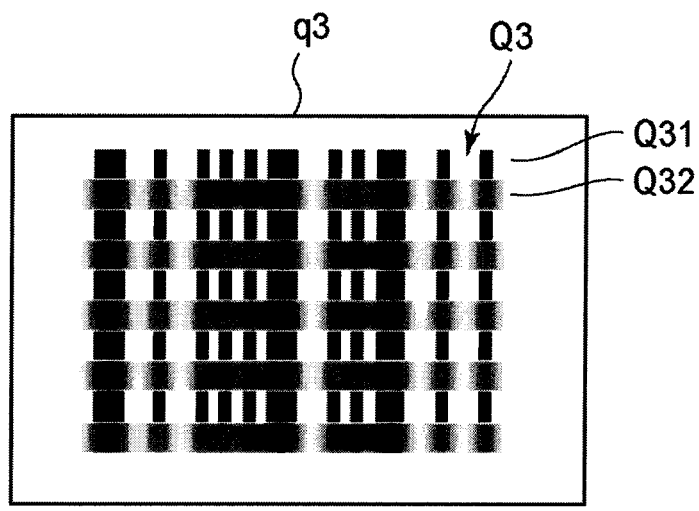
FIG. 13A is a diagram showing a frame image divided at two lines each imaging a barcode at a focus position at a close distance.

FIG. 13A is a diagram showing a frame image q3 including barcode image Q3 divided at two lines each imaging the barcode 41 at the focus position A.

Figure 13B:
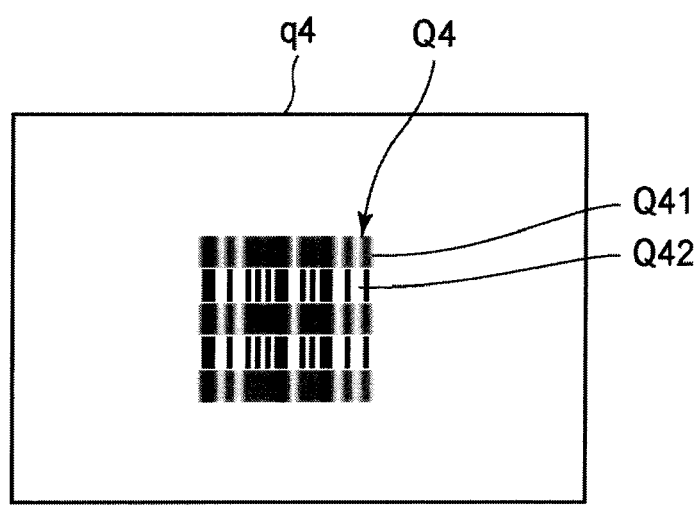
FIG. 13B is a diagram showing a frame image divided at two lines each imaging a barcode at a focus position at a far distance.

FIG. 13B is a diagram showing a frame image q4 including barcode image Q4 divided at two lines each imaging the barcode 41 at the focus position B.

As shown in FIG. 11, when the imager controller 19 receives the frame synchronizing signal and the line synchronizing signal output from the imaging element 211, the imager controller 19 synchronizes with the signal and changes the Duty ratio of the PWM signal to the voltage booster section 20 and changes the driving voltage applied to the liquid lens 212. Under the control of the imager controller 19, the focus of the imaging element 211 is set to focus position A at the start of the frame and line data transfer is performed from the imaging element 211 to the RAM 13. When the transfer of the line data of two lines of the frame is finished, the focus of the imaging element 211 switches to focus position B. Then, when the transfer of the line data of the next two lines of the frame is finished, the focus of the imaging element 211 switches to focus position A. Such switching of the focus and the transferring of line data is repeated.

With this, as shown in FIG. 12A, image data F2 with a different focus position at two lines each in a vertical direction of the screen can be obtained. The image data F2 alternately includes image data F21 at the focus position A and image data F22 at the focus position B. As shown in FIG. 12B, the border of the focus position is divided in the line data in the border area f2 between the image data F21 and the image data F22 in the image data F2.

As shown in FIG. 13A, frame image q3 when the barcode 41 is placed at a close distance includes a barcode image Q3 alternately including an image area Q31 and image area Q32. In the image area Q31, the image is focused and the bar is clear. In the image area Q32, the image is not focused and the bar is not clear.

As shown in FIG. 13B, the frame image q4 when the barcode 41 is placed at a far distance includes a barcode image Q4 alternately including an image area Q41 and image area Q42. In the image area Q41, the image is not focused and the bar is not clear, and in the image area Q42, the image is focused and the bar is clear.

Both barcode images Q3 and Q4 include image areas Q31 and Q42 in which the image is focused and the bar is clear. When a frame image including such barcode image is loaded, decoding can be performed. When image data F1 shown in FIG. 9A is loaded, operation is necessary so that the barcode image is at the center of the through screen (reading area of the imaging element 211) of the display section 14 when the barcode 41 placed at a far distance is read. When image data F2 shown in FIG. 12A is loaded, reading is possible regardless of the position where the barcode image is in the screen of the display section 14 when placed at a far distance. The image data of the barcode is divided with respect to each two lines but a barcode with high quality can be scanned without any problems.

Next, the barcode reading processing performed in the CPU 11 and the scanning controlling processing performed in the imager controller is described with reference to FIG. 14 and FIG. 15.

Figure 14:
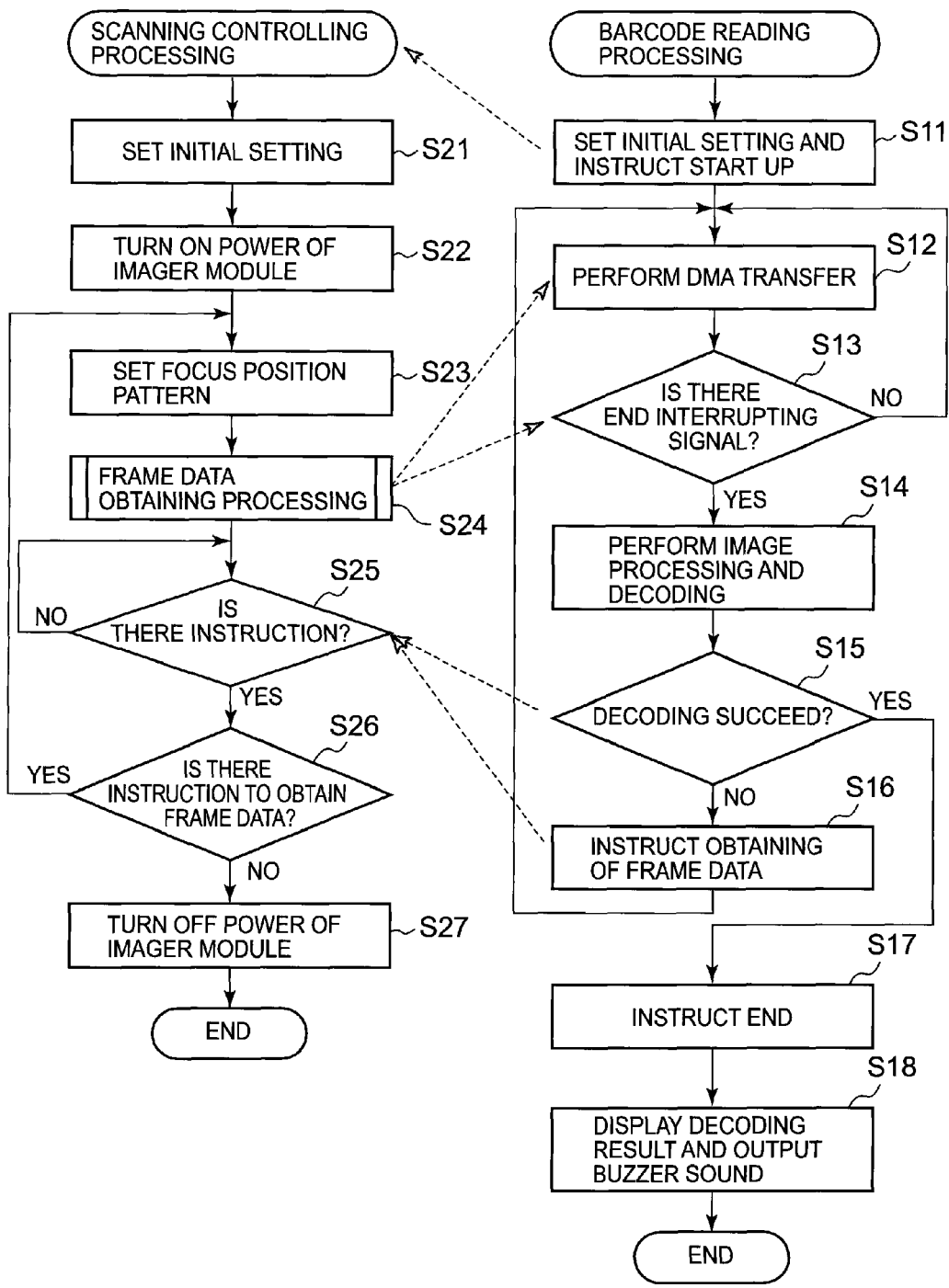
FIG. 14 is a flowchart showing a barcode reading processing performed in a CPU and a scanning controlling processing performed in an imager controller.

FIG. 14 is a flowchart describing the barcode reading processing performed in the CPU 11 and the scanning controlling processing performed in the imager controller.

Figure 15:
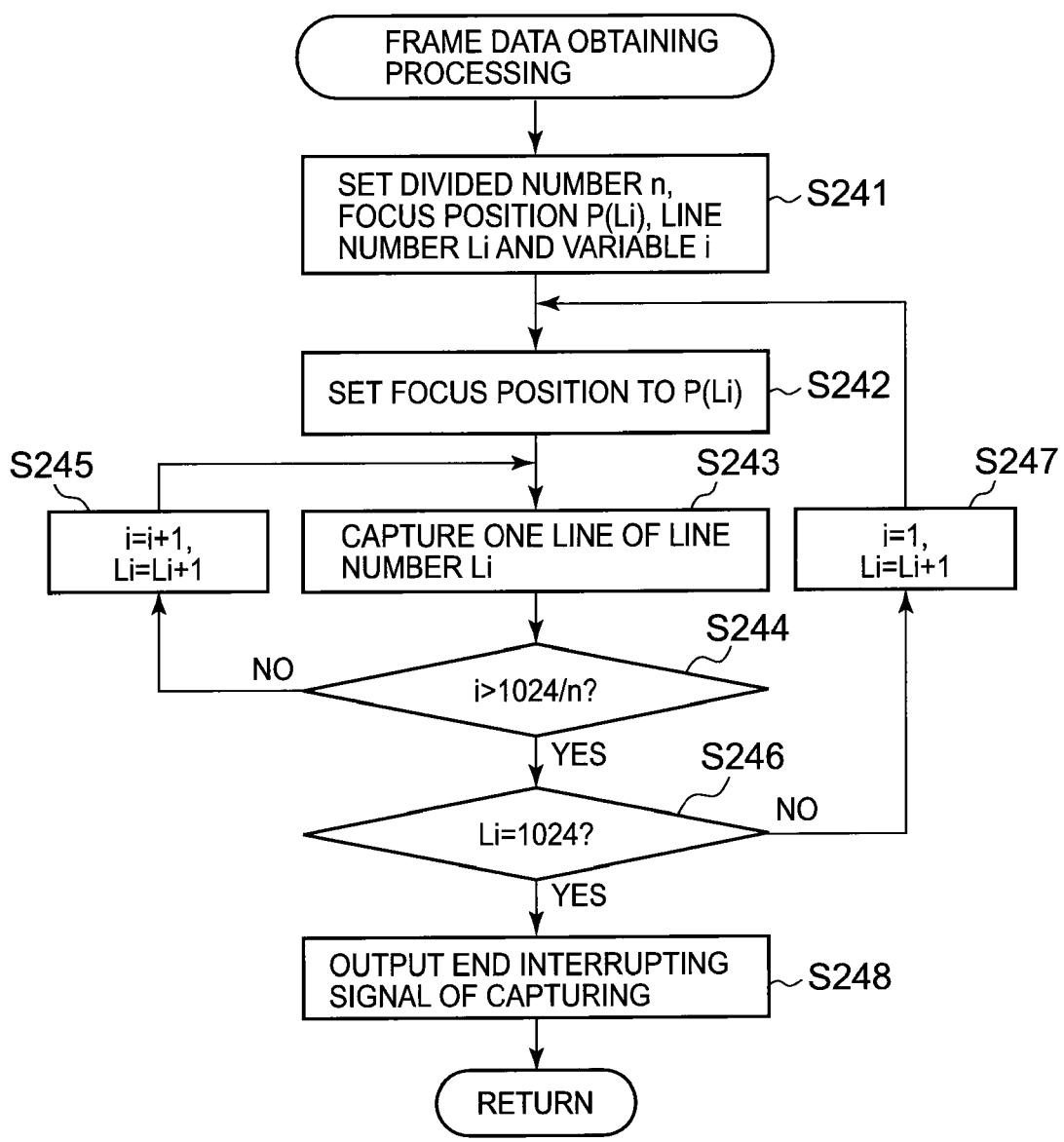
FIG. 15 is a flowchart showing a frame data obtaining processing in a scanning controlling processing.

FIG. 15 is a flowchart describing a frame data obtaining processing in the scanning controlling processing.

The barcode reading processing performed in the CPU 11 is described with reference to FIG. 14. The barcode reading processing is a processing in which the barcode is scanned using the imager module 21 and the image data of the obtained barcode is decoded. The user inputting by pressing the trigger keys 12A and 12C on the portable terminal 1 functions as a trigger, and the CPU 11 performs the barcode reading processing in coordination with the barcode reading program 151 read out from the ROM 15 and suitably expanded in the RAM 13.

First, the CPU 11 performs the initial setting and outputs the instruction signal of start up of imager module 21 to the imager controller 19 (step S11). Initial setting of step S11 is setting such as setting regarding storage area in the RAM 13 when DMA transfer of image data (line data) input from the imaging element 211 to the imager controller 19 is performed to the RAM 13.

Then, with the DMA function, the CPU 11 performs DMA transfer of the line data, which is input from the imaging element 211 to the imager controller 19, to the RAM 13 and stores the data (step S12). Then, the CPU 11 judges whether or not an end interrupting signal indicating end of obtaining frame data is received or not from the imager controller 19 (step S13). When the end interrupting signal is not received (step S13; NO), the processing advances to step S12.

When the end interrupting signal is received (step S13; YES), the CPU 11 performs image processing of combining a plurality of pieces of line data for one frame stored in the RAM 13 as image data for one frame to ease decoding, and then performs decoding of the barcode image included in the image data on which the image processing is performed (step S14). Then, the CPU 11 judges whether or not the decoding in step S14 succeeds (step S15).

When the decoding does not succeed (step S15; NO), the CPU 11 outputs a frame data obtaining instruction signal to instruct obtaining of frame data (line data of one frame) to the imager controller 19 (step S16), and the processing advances to step S12.

When the decoding succeeds (step S15; YES), the CPU 11 outputs an instruction signal to end scanning to the imager controller 19 (step S17). Then, the CPU 11 displays the decoded result on the display section 14 and allows the sound output section 18 to output the buzzer sound indicating that the decoding succeeded (step S18) and the barcode reading processing ends.

Next, the scanning controlling processing performed by the imager controller 19 is described. The scanning controlling processing is a processing in which the barcode is scanned using the imager module 21 to obtain image data including a barcode image including a plurality of areas with different focus distances. The imager controller 19 performs the scanning controlling processing triggered by input of the instruction signal of start up from the CPU 11 in the portable terminal 1 corresponding to step S11 of the barcode reading processing.

First, the imager controller 19 performs initial setting (step S21). The initial setting of step S21 is setting such as setting regarding receiving image data from the imager module 21. Then, the imager controller 19 turns on the power source of the imager module 21 (step S22).

Then, the imager controller 19 sets the focus position pattern (step S23). The focus position pattern is a pattern of the number of divided areas of the image area or the number of lines in each image area after dividing the frame image of one frame and the focus position of the liquid lens 212 in each divided image area. For example, in the example of FIG. 9A, the number of divided areas of the image area in one frame is 3, and the focus position pattern is set so that the focus position of each image area is from the top to bottom in order, focus position A, B, A. In the example of FIG. 12A, the number of lines of each image area after dividing of one frame is 2, and the focus position pattern is set so that the focus position of each image area is from the top to bottom in order, focus position A, B, A, and so on.

Then, the imager controller 19 performs the frame data obtaining processing to obtain image data of a frame image of one frame according to the focus position pattern set in step S23 (step S24). The frame data obtaining processing of step S24 is described in detail later.

Then, corresponding to steps S16 and S17 of the barcode reading processing, the image controller 19 determines whether or not the instruction signal to obtain frame data or to end is input from the CPU 11 (step S25). When the instruction signal is not input (step S25; NO), the processing advances to step S25. When the instruction signal is input (step S25; YES), the imager controller 19 determines whether or not the instruction signal input in step S25 is an instruction signal to obtain frame data (step S26).

When the instruction signal is an instruction to obtain frame data (step S26; YES), the processing advances to step S23. When the processing advances from step S26 to step S23, in step S23, the focus position pattern is set to a focus position pattern different from the one before. A focus position pattern in which the number of divided areas or the number of lines of the image area is not changed and only the focus position is changed or a focus position pattern in which the number of divided area is one can be set. Moreover, one focus position pattern can be selected from a plurality of focus position patterns set in advance.

When the instruction signal is not an instruction to obtain frame data (step S26; NO), the instruction signal is to end and the imager controller 19 turns off the power source of the imager module 21 (step S27) and the scanning controlling processing ends.

The frame data obtaining processing in step S24 is described with reference to FIG. 15. First, according to the focus position pattern set in step S23, the number of divided areas n of the frame image of one frame, the focus position P(Li) of the liquid lens 212 in each divided image area, the line number Li of the frame image (=1), the variable i (=1) are initially set (step S241). Then, the focus position of the liquid lens 212 is set to focus position P(Li), the PWM signal corresponding to the focus position P(Li) is generated and the signal is output to the voltage booster section 20 (step S242). According to the PWM signal, the focus position of the liquid lens 212 is changed or maintained.

Then, the imager controller 19 outputs the line specifying signal corresponding to line Li to the imaging element 211 and the line data corresponding to the line Li of the frame image captured by the imaging element 211 is input (step S243). The line data input in step S243 is transferred by DMA transfer to the RAM 13 by the CPU 11 in step S12 of the barcode reading processing.

Then, the imager controller 19 determines whether or not variable i>1024/n (step S244). 1024 in step S244 is a total number of lines of the frame image of imaging element 211. An imaging element in which the total number of lines of the frame image is a number other than 1024 can be used as the imaging element 211. When the total number of lines is not i>1024/n, (step S244; NO), the imager controller 19 increments 1 to the variable i and increments 1 to the line number Li (step S245) and the processing advances to step S243.

When i>1024/n (step S244; YES), the imager controller 19 judges whether or not the line number Li=1024 (step S246). When the line number Li is not Li=1024, (step S246; NO), the imager controller 19 sets 1 to the variable i and increments 1 to the line number Li (step S247) and the processing advances to step S242. When the line number Li is Li=1024 (step S246; YES), the imager controller 19 outputs an end interrupting signal to end image capturing of one frame to the CPU 11 (step S248), and the frame data obtaining processing ends.

Here, an example of the barcode reading processing in the portable terminal 1 of the present embodiment is described with reference to FIG. 16.

Figure 16:
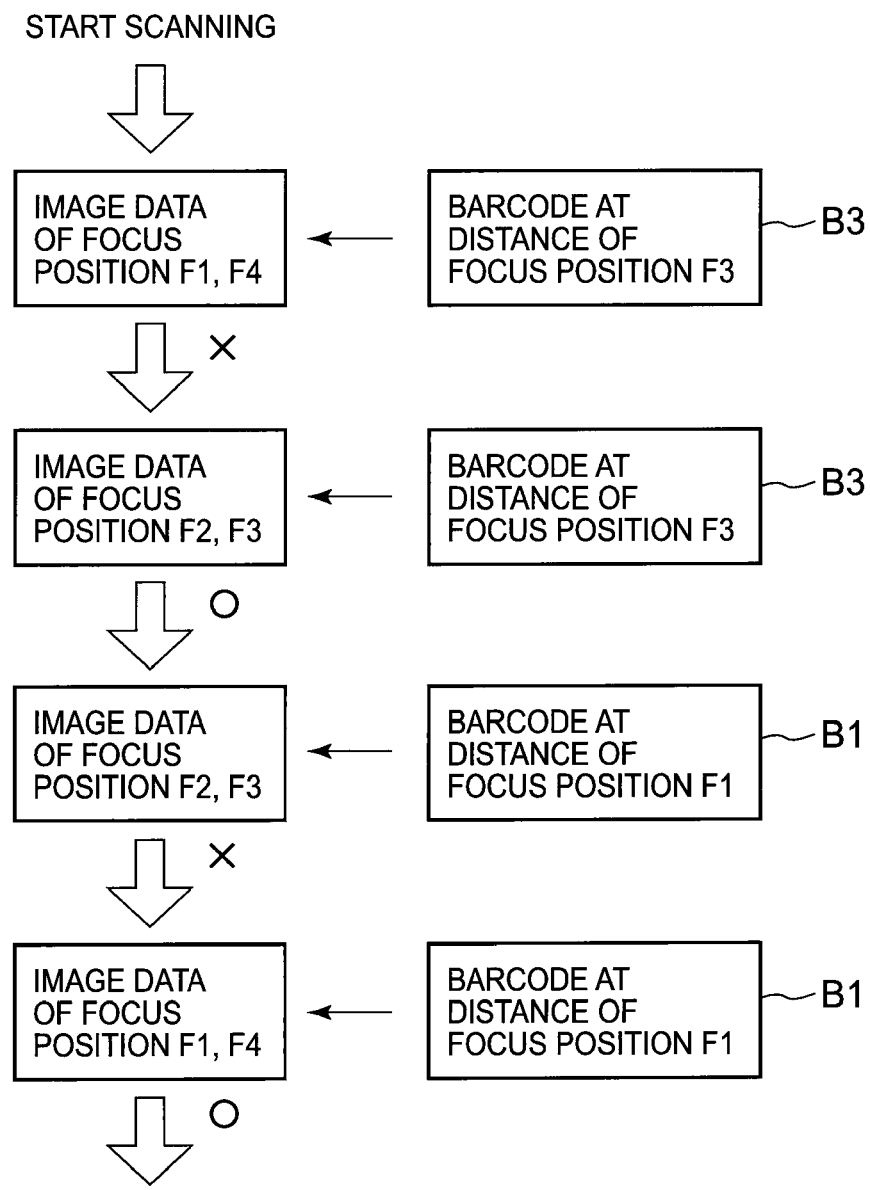
FIG. 16 is a diagram showing an example of a process of barcode reading in a portable terminal.

FIG. 16 is a diagram showing an example of the barcode reading processing in the portable terminal 1.

In the case described here, in step S23 of the scanning controlling processing, the number of divided areas of the frame image is fixed to 3, and the focus distance of the image area in one frame is changed repeatedly as focus distance F1, F4→focus distance F2, F3→focus distance F1, F4→ and so on. Similar to the description of the conventional imager device shown in FIG. 18, in the example described here, a barcode B3 at a distance corresponding to the focus position F3, and the barcode B1 at a distance corresponding to the focus position F1 are read in order and the focus positions F1, F2, F3 and F4 are four steps of focus positions of liquid lenses aligned in order from a position where the object is near to a position where the object is far.

The trigger key 12A is pressed on the portable terminal 1 to start the barcode reading processing by the CPU 11 and the scanning controlling processing by the imager controller 19 is started. As for the first frame, the focus position of the liquid lens 212 is divided in three and set to focus positions F1→F4→F1 in step S23 of the scanning controlling processing, image capturing is performed on the barcode B3 in step S24 of the scanning controlling processing and decoding is performed in step S14 of the barcode reading processing. Then, since the barcode image of the obtained image data is not focused, the decoding fails and instruction to obtain frame data is performed in step S16 of the barcode reading processing. In the next frame, the focus position of the liquid lens is divided in three and set to focus positions F2→F3→F2 in step S23 of the scanning controlling processing, image capturing is performed on the barcode B3 in step S24 of the scanning controlling processing and decoding is performed in step S14 of the barcode reading processing. Since the barcode image of the obtained image data is focused, the decoding succeeds and the decoded result of the barcode B3 is displayed on the display section 14 in step S18 of the barcode reading processing.

Then similarly, the trigger key 12A is pressed on the portable terminal 1 to start the barcode reading processing and the scanning controlling processing. As for the first frame, the focus position of the liquid lens 212 is divided in three and set to focus positions F2→F3→F2 in step S23 of the scanning controlling processing, image capturing is performed on the barcode B1 in step S24 of the scanning controlling processing and decoding is performed in step S14 of the barcode reading processing. Then, since the barcode image of the obtained image data is not focused, the decoding fails and instruction to obtain frame data is performed in step S16 of the barcode reading processing. In the next frame, the focus position of the liquid lens is divided in three and set to focus positions F1→F4→F1 in step S23 of the scanning controlling processing, image capturing is performed on the barcode B3 in step S24 of the scanning controlling processing and decoding is performed in step S14 of the barcode reading processing. Since the barcode image of the obtained image data is focused, the decoding succeeds and the decoded result of the barcode B1 is displayed on the display section 14 in step S18 of the barcode reading processing.

Figure 18:
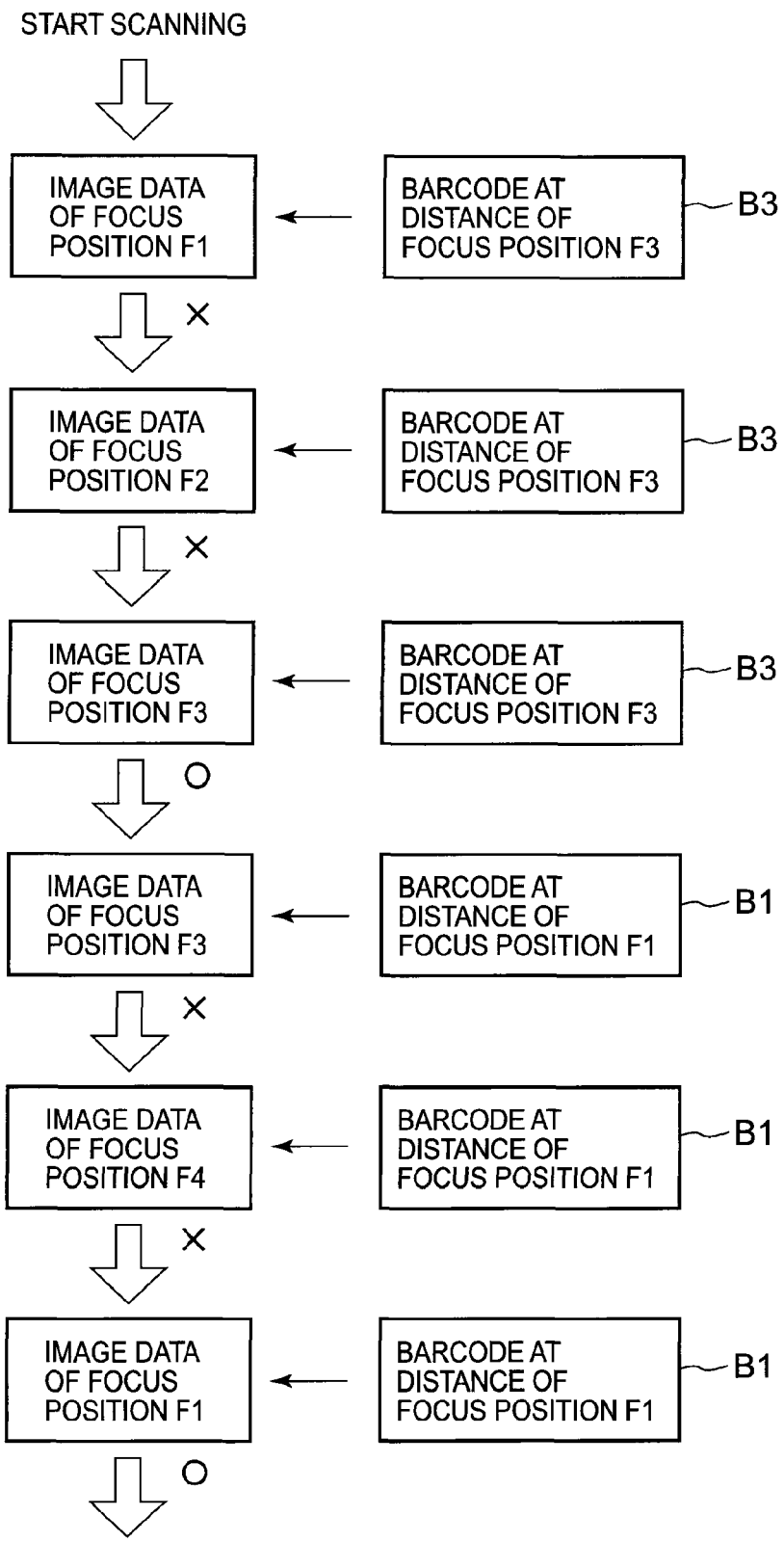
FIG. 18 is a diagram showing an example of a process of barcode reading by an imager device including a conventional automatic focus mechanism.

As described above, the number of steps is less, the number of times of image capturing and decoding of the frame is less and the barcode reading time is shortened in the scanning process described in portable terminal 1 compared to the scanning process of the imager device including the conventional automatic focus mechanism as described in FIG. 18.

According to the present embodiment, the portable terminal 1 includes a liquid lens 212, an imaging element 211, an imager controller 19 to change a focus position of the liquid lens 212 to obtain image data of a plurality of image areas with different focus positions in one frame from the imaging element 211 when obtaining image data of one frame, and a CPU 11 to decode a barcode image included in the image data of the plurality of image areas obtained by the image controller 19. Therefore, when the barcode is read using the liquid lens 212, the barcode image including a plurality of focus positions can be decoded for image data of one frame, and the reading time can be shortened.

Moreover, when the image data of one frame is obtained, the imager controller 19 changes the focus position of the liquid lens 212 with respect to each image area in which an image of one frame is divided at the lines to be a predetermined number of areas, and obtains image data of a plurality of image areas with different focus positions from the imaging element 211. Therefore, the frame image can be easily divided to the desired number of areas.

Moreover, when the image data of one frame is obtained, the imager controller 19 changes the focus position of the liquid lens 212 with respect to each image area including a predetermined line number of the image of the frame, and obtains image data of a plurality of image areas with different focus positions from the imaging element 211. Therefore, the frame image can be easily divided to the desired line number.

Moreover, the portable terminal 1 includes a liquid lens 212. Therefore, the liquid lens 212 can change the focus position quickly, the durability is enhanced since there is no physically movable section, and the consumed electric power can be reduced since an electric current does not flow through the liquid lens 212.

Moreover, the capturing element 211 is a CMOS image sensor and performs exposure and transfer of image data with respect to each line of the frame image. Therefore, image data in which the frame image is divided into a plurality of image areas can be easily obtained.

Moreover, the CPU 11 combines the image data of a plurality of image areas obtained from the imaging element 211 as image data of one frame and decodes the barcode image included in the combined image data. Therefore, the barcode image can be easily decoded.

Moreover, when decoding fails, the image controller 19 changes the focus position pattern of the variable focus lens in the image area and obtains image data of a plurality of image areas with a different focus position from the imaging element 211. Therefore, a barcode image including a plurality of focus positions with different focus position patterns can be decoded, and reading time can be shortened.

Moreover, the imager controller 19 selects a pattern from a plurality of different focus position patterns and changes the pattern. Therefore, the focus position pattern can be easily changed.

The description of the present embodiment is an example of the barcode reading apparatus of the present invention and the present invention is not limited to the above.

The embodiment described above uses a liquid lens 212 as a variable focus lens, however, the embodiment is not limited to the above. Other variable focus lenses can be used, for example, a variable focus lens using KTN (potassium tantalate niobate, $KT_{a1-x}Nb_xO_3$) which is a type of "electrically engineered crystal" in which the refractive index changes due to applied voltage.

Moreover, the above described embodiment describes the imager controller 19 being a semiconductor circuit such as an ASIC, however, the embodiment is not limited to the above. For example, the imager controller 19 can be composed of a CPU, RAM and ROM, and the imager controller 19 can perform the processing in coordination with a CPU and a program read out from the ROM and expanded in the RAM.

Further, the specific configuration and operation of each component of the portable terminal of the above described embodiment can be changed appropriately without leaving the scope of the invention.

The entire disclosure of Japanese Patent Application No. 2010-056962 filed on Mar. 15, 2010 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

According to an aspect of the preferred embodiments of the present invention, there is provided a barcode reading apparatus including:
    a variable focus lens in which a focus position can be adjusted at a high speed according to applied voltage;
    an imaging section to generate image data by imaging a barcode through the variable focus lens;
    a control section to change a focus position of the variable focus lens and to obtain image data of a plurality of image areas with different focus positions in one frame from the imaging section when image data of one frame is obtained from the imaging section; and
    a decoding section to decode a barcode image included in the image data of the plurality of image areas obtained by the control section.

Preferably, in the barcode reading apparatus, when the image data of one frame is obtained from the imaging section, the control section changes the focus position of the variable focus lens with respect to each image area, the image area being an area in which an image of one frame is divided to a predetermined number of divided areas at a line, and the control section obtains the image data of the plurality of image areas with different focus positions from the imaging section.

Preferably, in the barcode reading apparatus, when the image data of one frame is obtained from the imaging section, the control section changes the focus position of the variable focus lens with respect to each image area including a predetermined number of lines of an image of one frame, and the control section obtains the image data of the plurality of image areas with different focus positions from the imaging section.

Preferably, in the barcode reading apparatus, the variable focus lens is a liquid lens in which a lens face is composed of a plurality of liquids including different refractive indexes.

Preferably, in the barcode reading apparatus, the imaging section is a CMOS image sensor to perform exposure and transfer of image data with respect to each line of the frame image.

Preferably, in the barcode reading apparatus, wherein the decoding section combines the image data of the plurality of image areas obtained from the imaging section as image data of one frame and decodes the barcode image included in the combined image data.

Preferably, in the barcode reading apparatus, when the decoding by the decoding section fails, the control section changes the focus position pattern of the variable focus lens in the image area and obtains image data of a plurality of image areas with a different focus position from the imaging section.

Preferably, in the barcode reading apparatus, the control section selects one pattern from a plurality of different focus position patterns and changes the pattern.

According to an aspect of the preferred embodiments of the present invention, there is provided a computer program product readable by a computer used in a barcode reading apparatus to encode an instruction to perform computer processing, the computer processing including:

imaging to image a barcode through a variable focus lens in which a focus position can be adjusted at a high speed according to applied voltage to generate image data;

controlling to change the focus position of the variable focus lens to obtain image data of a plurality of image areas with different focus positions in one frame when obtaining image data of one frame imaged in the imaging step; and decoding to decode a barcode image included in the image data of the plurality of image areas obtained by the controlling step.

What is claimed is:

1. A barcode reading apparatus to read a barcode image from image data of a taken image, the apparatus comprising:

a capturing section to, in capturing a one-frame image, (i) divide the one-frame image into a plurality of image areas so that the image areas with different focus positions exist in the one-frame image, and (ii) change a focus position with respect to each of the image areas so as to capture images of the image areas with the different focus positions; and a generating section to combine the images of the image areas captured by the capturing section so as to generate image data of the one-frame image, wherein the barcode reading apparatus has multiple types of focus position patterns with each of which the capturing section changes the focus position with respect to each of the image areas, wherein the capturing section selects a focus position pattern from among the focus position patterns, and, in accordance with the selected focus position pattern, (i) divides the one-frame image into the plurality of image areas and (ii) changes the focus position with respect to each of the image areas so as to capture the images of the image areas with the different focus positions, and wherein the barcode reading apparatus further comprises:

a decoding section to decode the barcode image contained in the image data generated by the generating section;

a judging section to judge whether or not the decoding by the decoding section succeeds; and a pattern changing section to change the selected focus position pattern to another focus position pattern from among the plurality of the focus position patterns when the judging section judges that the decoding fails.

2. The barcode reading apparatus according to claim 1, wherein the capturing section includes a variable focus lens to change the focus position so as to capture the images of the image areas with the different focus positions, and changes a focus position of the variable focus lens to change the focus position with respect to each of the image areas.

* * * * *